No. 842,231. PATENTED JAN. 29, 1907.
V. H. McDOWELL.
PNEUMATIC TIRE.
APPLICATION FILED DEC. 4, 1905.
3 SHEETS—SHEET 3.
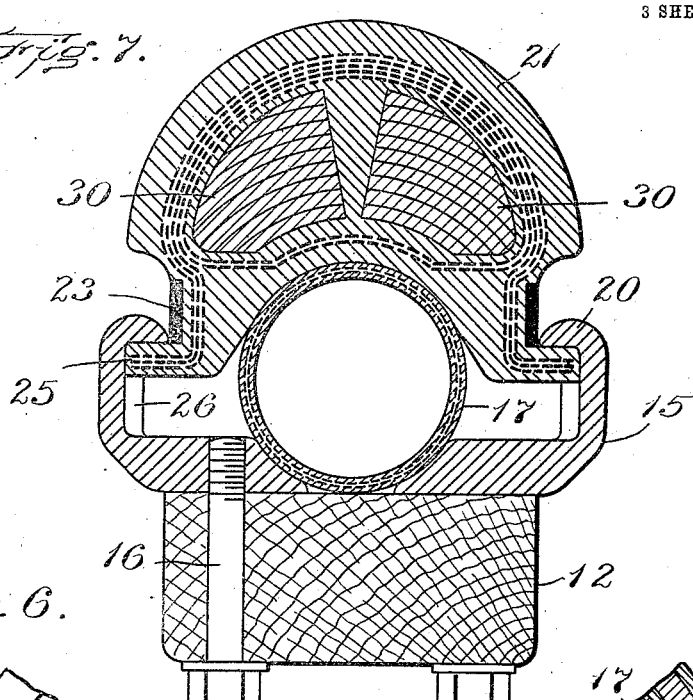
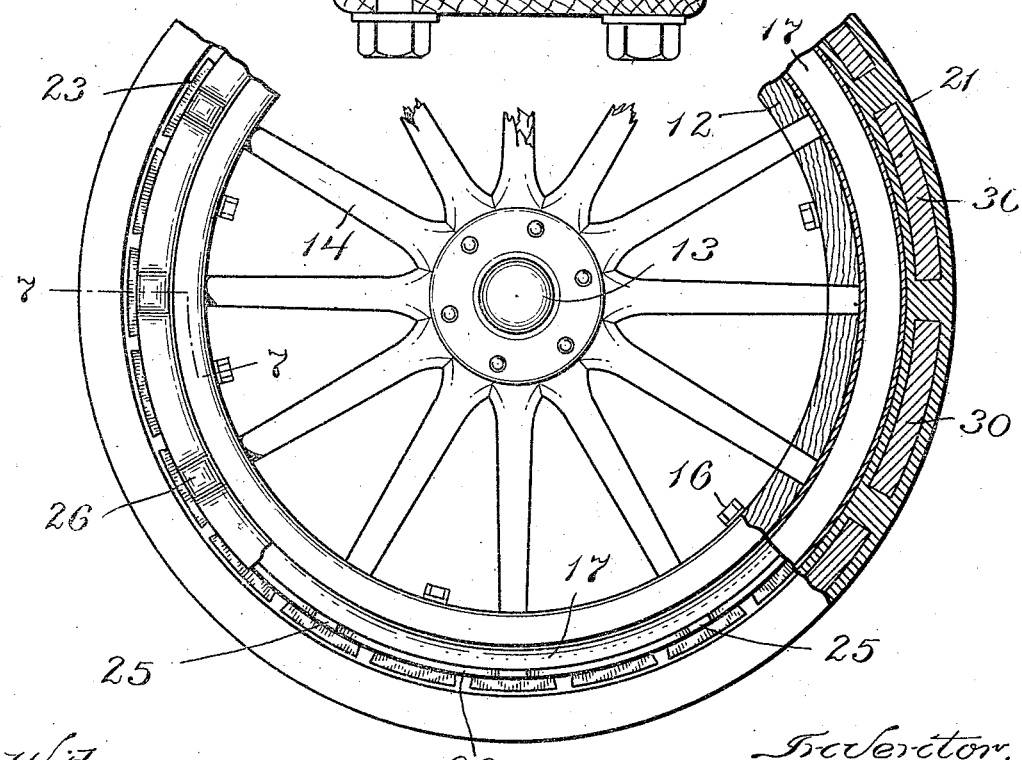
Witnesses:
Walter P. Abell.
E. Batchelder
Inventor,
V. H. McDowell,
by Wright Brown Quinby & May
Attorneys.

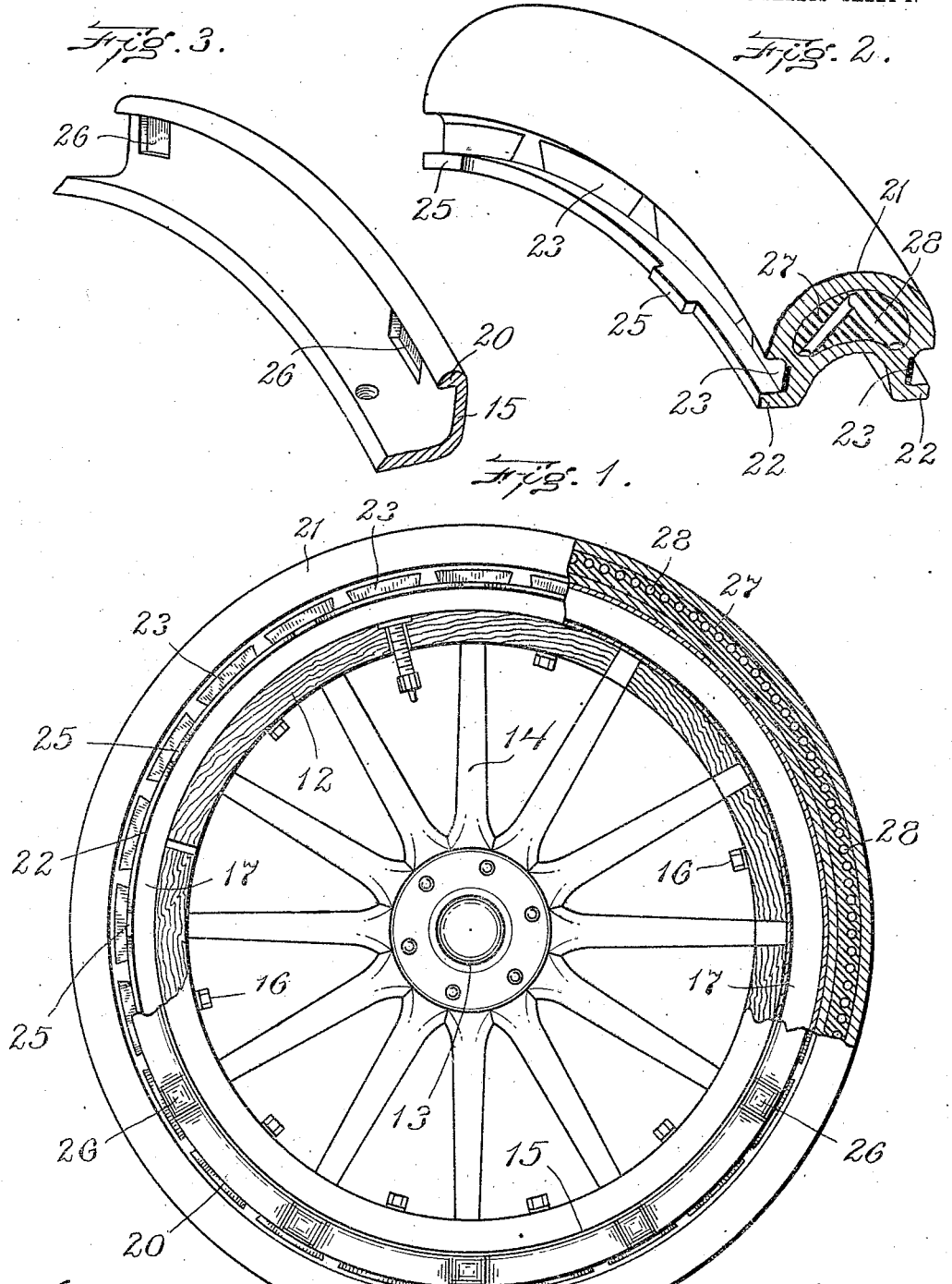

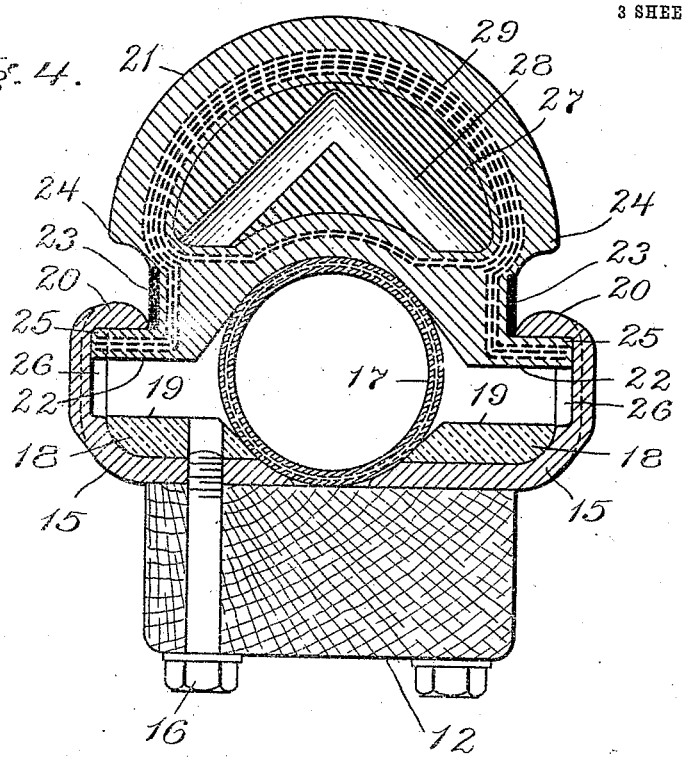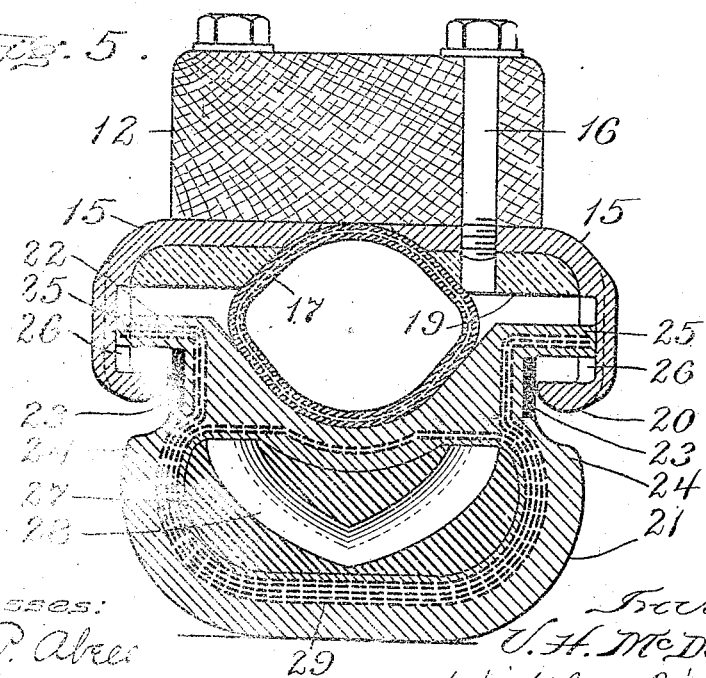

UNITED STATES PATENT OFFICE.

VALENTINE H. McDOWELL, OF LYNN, MASSACHUSETTS.

PNEUMATIC TIRE.

No. 842,231.

Specification of Letters Patent.

Patented Jan. 29, 1907.

Application filed December 4, 1905. Serial No. 290,060.

*To all whom it may concern:*

Be it known that I, VALENTINE H. MC-DOWELL, of Lynn, in the county of Essex and State of Massachusetts, have invented certain new and useful Improvements in Vehicle-Wheels and Tires Therefor, of which the following is a specification.

This invention relates to vehicle-wheels, chiefly for heavy motor-vehicles, having tires which are capable of a limited bodily edgewise movement relatively to the wheel, so that the tire can yield as a whole, its lower portion bearing on the ground and being free to move toward the adjacent portion of the wheel rim or felly, while the upper portion is at the same time free to move to a limited extent away from the corresponding portion of the wheel-rim.

The invention has for its object to provide a simple and durable wheel of the character described, the improvements being embodied both in the structure of the rigid portion of the wheel-rim and in the structure of the flexible edgewise-movable tire.

The invention consists in the improvements which I will now proceed to describe and claim.

Of the accompanying drawings, Figure 1 represents a partial side elevation and partial sectional view of a vehicle-wheel embodying my invention. Fig. 2 represents a perspective view of a portion of the tire detached. Fig. 3 represents a perspective view of a portion of one of the clencher-plates forming a part of the wheel structure. Fig. 4 represents a transverse section through the upper portion of the wheel, showing the air-tube and tire uncompressed. Fig. 5 represents a transverse section through the bottom portion of the wheel, showing the air-tube and tire under compression, the latter being moved inwardly toward the wheel-rim. Fig. 6 represents a partial side elevation and partial sectional view showing a portion of a wheel embodying my invention and including a modified construction of the tire. Fig. 7 represents a section on line 7 7 of Fig. 6.

The same reference characters indicate the same parts in all the figures.

In the drawings, 12 represents the felly, 13 the hub, and 14 the spokes, of a vehicle-wheel, these parts being of any suitable construction. The felly 12 and the rigid clencher-plates 15, detachably secured to the felly by bolts 16, are hereinafter denominated the "rim." The said rim is provided with a peripheral seat for an air-tube 17, the said seat being here shown as formed in part by the beveled inner edges of the clencher-plates 15 and by a portion of the outer surface of the felly 12 between the clencher-plates.

Preferably filling-pieces 18, of wood or other light material, are placed upon the outer surfaces of the clencher-plates, these filling-pieces having beveled edges constituting continuations of the air-tube seat and annular faces or seats 19 at opposite sides of the air-tube, said seats being formed to support the tire, hereinafter described, in the event of deflation of the air-tube 17. The clencher-plates 15 are provided at their outer edges with inwardly-projecting rigid flanges 20, which overhang the edge portions of the wheel-rim.

21 represents the tire, which is composed wholly or mainly of elastic material, such as vulcanized rubber, and is adapted to move bodily edgewise between the seats 19 and the rigid flanges 20 of the wheel-rim, the said tire having outwardly-projecting flanges 22, projecting under the rigid flanges 20 and adapted to play between the last-named flanges and the seats 19, as indicated in Figs. 4 and 5.

The side portions of the tire adjacent to the flanges 22 are in rubbing contact with the inner edges of the rim-flanges 20. To prevent injurious wear of these portions of the tire, I provide them with wear-resisting facings 23, which are or may be plates of relatively hard rubber vulcanized into the body portion of the tire. The facings or facing-pieces 23 are independent of each other and are separated from each other by intermediate portions of the resilient body of the tire, so that they do not interfere with the flexibility of the tire, the latter being continuous. The material of the facing-pieces, while harder than that of the body of the tire, should not be so rigid as to cause the edges of the pieces to cut or crush the portions of the tire-body that bear on them.

The tire is preferably provided with laterally-projecting shoulders 24, which overhang the rigid flanges 20 of the rim and are so formed as to abut against said flanges when the flanges 22 of the tire abut against the sides 19 of the rim. This will occur only in the event of deflation of the air-tube, the simultaneous bearing of the tire-shoulders 24 on the rigid flanges and of the tire-flanges 22 on the rigid seats providing for a secure and firm support of the tire, so that it will be operative even though the air-tube be deflated.

To prevent the tire from creeping on the wheel-rim, I provide the tire-flanges 22 with tenons or projections 25, adapted to enter and engage recesses or mortises 26, formed in the clencher-plates 15.

The tire 21 is preferably composed of a main body portion on which the tread-surface of the tire is formed, said body portion being of rubber vulcanized to a suitable hardness to give the tread the usual or suitable wearing qualities. The said body portion may be formed to surround a core 27, of softer rubber. The said core is preferably provided with a series of air-chambers 28, which may be of the angular form represented in Figs. 2 and 4. These chambers are hermetically closed and confine bodies of air which absorb a considerable part of the heat which would otherwise be transmitted by friction through the tire to the air-tube, the liability of injury to the air-tube by heat transmitted through the tire being thus reduced. The soft-rubber core with its air-chambers increases the yielding quality of the tire. I prefer to strengthen and reinforce the body portion of the tire by means of layers of frictioned textile fabric 29, said layers extending into the flanges 22 and strengthening and reinforcing the latter.

The air-tube 17 is composed of rubber reinforced by textile fabric, as usual in air-tubes for automobile-tires, and is practically inextensible by air-pressure. That is to say, it is free from liability to be stretched by air introduced under pressure into its interior. The wheel rim and tire are provided with grooves which receive the inner and outer portions of the air-tube, the sides of said grooves being flared or inclined, so that they are tangential to the periphery of the air-tube when the latter is in its normal position, as shown in Fig. 4, the inclination of the sides of the grooves being such that when the tire is forced inwardly the portions of the air-tube which are bulged outwardly by the inward movement of the tire are contained in the spaces provided by the inclined sides of the grooves and do not project between the contacting portions of the wheel rim and tire. Hence there is no liability of injurious crushing or biting pressure of the tire and rim upon the air-tube.

In Figs. 7 and 8 I show, instead of the core 27, of soft rubber, filling-pieces 30, which may be of leather or other suitable material embedded in the body portion of the tire. These filling-pieces may be used when a tire of greater hardness is required than would be furnished by the construction shown in Figs. 1, 2, and 4.

It will be seen by reference to Figs. 4 and 5 that the opposed faces of the rim and tire are formed to permit the seating of the flanges 22 of the tire on the faces 19 of the rim without bringing the said opposed faces into biting engagement with the side portions of the air-tube, which are displaced by the inward movement of the tire. In other words, the displaced side portions of the air-tube cannot be crushed or bitten between the meeting portions of the tire and rim. This result is due to the widening of the outer portions or mouths of the grooves formed in the rim and tire for the reception of the air-tube. Each air-chamber 28 is composed of two oppositely-inclined branches, which meet at the central portion of the tire in relatively close proximity to the median line of the tread and diverge from said meeting-point toward the edges of the tire. This formation of the air-chambers results in a greater resilience along the median line of the tire-tread than at the side portions of the tread, owing to the closer proximity of the air-chambers to the median line than to the side portions. The tire therefore has a line of maximum resilience extending along its median line, the resilience being due to the compressibility of the material between the angular central portions of the air-chambers and the median line of the tread. This compression causes the closing of the angular portions of the air-cells, after which the portions of the tire-body forming the inner walls of the air-cells supports the portions forming the outer walls, so that the compressing pressure is gradually transferred from the portions of the tire outside the air-chambers to the portions inside, there being no tendency of the pressure to laterally displace the tire in either direction from the median line.

Having thus explained my invention and described a way of constructing and using the same, although without having attempted to set forth all the forms in which it may be embodied or all the modes of its use, I claim—

1. A vehicle-wheel comprising a rigid rim having a groove forming a peripheral air-tube seat, lateral tire-seats at opposite sides of the tube-seat, and inwardly-projecting rigid flanges overhanging the said lateral seats, a practically inextensible air-tube supported by the tube-seat, and adapted to bulge laterally therefrom toward the tire-seats, and an elastic tire yieldingly supported by the air-tube, and having a groove in its inner side adapted to receive the outer portion of the air-tube, and outwardly-projecting flanges adapted to play between the flanges and the lateral seats of the rim, and to abut against said seats, the sides of the grooves of the rim and tire being flared or inclined to form spaces which prevent the laterally-bulging portions of the tube from being crushed between the contacting portions of the tire-seats and flanges.

2. A vehicle-wheel comprising a rigid rim having a peripheral air-tube seat, lateral tire-seats at opposite sides of the tube-seat, and inwardly-projecting rigid flanges overhanging the tire-seats, an air-tube supported by the tube-seat, and an elastic tire yieldingly supported by the air-tube and having lateral outwardly-projecting shoulders overhanging the rigid flanges, and inwardly-projecting flanges adapted to play between the said rigid flanges and lateral tire-seats, the said tire being free from clamping engagement with the rim.

3. A vehicle-wheel having a rigid rim, comprising a felly having an air-tube seat and annular clencher-plates bearing on the felly at opposite sides of the seat, said plates having inwardly-projecting rigid flanges, means for detachably securing the said plates to the felly, an air-tube supported by the tube-seat and adapted to expand laterally between the clencher-plates, and an elastic tire yieldingly supported by the air-tube and having outwardly-projecting flanges adapted to play within the flanges of the clencher-plates, the said tire being free from clamping engagement with the rim.

4. A vehicle-wheel having a rigid rim comprising a felly having an air-tube seat and annular clencher-plates at opposite sides of the seat, said plates having inwardly-projecting rigid flanges, an air-tube supported by the tube-seat, and an elastic tire yieldingly supported by the air-tube and having outwardly-projecting shoulders overhanging the clencher-plate flanges and outwardly-projecting flanges adapted to play within the clencher-plate flanges, said tire-flanges and the clencher-plates having interlocking members to prevent the tire from creeping.

5. A continuous yieldingly-supported elastic tire having outwardly-projecting flanges provided with outwardly-projecting tenons adapted to engage mortises in a wheel-rim, and outwardly-projecting shoulders overhanging said flanges, the said shoulders and flanges being separated by spaces adapted to receive clenchers at opposite edges of the tire, the width of said spaces exceeding the thickness of the clenchers, whereby inward and outward play of the tire, independently of the clenchers, is permitted.

6. A continuous elastic tire having outwardly-projecting clencher-engaging flanges, and wear-resisting facing-pieces between said flanges and the tread portion of the tire, said facing-pieces being separated from each other by intermediate portions of the elastic body of the tire, and composed of a material which is free from liability to crush the body portions of the tire bearing on the edges of the said facing-pieces.

7. A continuous elastic tire having outwardly-projecting flanges, outwardly-projecting shoulders overhanging said flanges and separated therefrom by clencher-receiving spaces or grooves, and wear-resisting facing-pieces at the bottoms of said grooves, said facings being separated from each other by intermediate portions of the elastic body of the tire.

8. An elastic tire having hermetically-closed cells or chambers containing heat-absorbing bodies of air, each chamber having two oppositely-inclined branches which meet at the central portion of the tire in relatively close proximity to the median line of the tread, and diverge from said meeting-point toward the edges of the tire.

In testimony whereof I have affixed my signature in presence of two witnesses.

VALENTINE H. McDOWELL.

Witnesses:
CHARLES F. BROWN,
E. BATCHELDER.